Dec. 23, 1969  S. F. FOHRMAN  3,485,416
COMBINATION SALT AND PEPPER SHAKER
Filed Dec. 1, 1967

INVENTOR.
SEYMOUR F. FOHRMAN
BY Edward C. Threedy
HIS ATTORNEY.

United States Patent Office 3,485,416
Patented Dec. 23, 1969

3,485,416
COMBINATION SALT AND PEPPER SHAKER
Seymour F. Fohrman, Glencoe, Ill.
(8242 McCormick Blvd., Skokie, Ill. 60076)
Filed Dec. 1, 1967, Ser. No. 687,279
Int. Cl. A47g 19/24
U.S. Cl. 222—142.1                    1 Claim

ABSTRACT OF THE DISCLOSURE

A salt and pepper shaker combined as a single unit, one capable of easy handling and especially useful for picnics, lunch boxes, food kits, and capable of being carried in one's purse or bag when traveling, and ideal for use by the military. The shaker comprises two aligned containers removably connected in end abutment with respect to each other and separable for individual filling with material, the dispensing ends of said containers being perforated and each closed by a moisture-proof, spill-proof and snap fitting cap connected to its respective container by a flexible strap.

SUMMARY OF INVENTION

Summarily my invention dispenses with the usual separate salt and pepper shaker and provides in lieu thereof a unitary structure comprising containers arranged in longitudinal alignment with respect to each other, and connected in end relation by a coupling which serves the dual purpose of connecting the containers together and closing the open ends of the containers through which the salt or pepper is poured into the containers. The opposite ends of the containers are each closed by a perforated wall covered by a snap cap hinged to its respective container by a strap which is formed of the same material as the cap and container, thus facilitating simultaneous molding and the formation of the container, cap and hinge as an integral structure.

DESCRIPTION OF INVENTION

The invention consists in the novel combination and arrangement of parts to be hereinafter described and claimed.

The invention will be best understood by reference to the accompanying drawings showing a preferred form of construction and in which.

Figure 1:
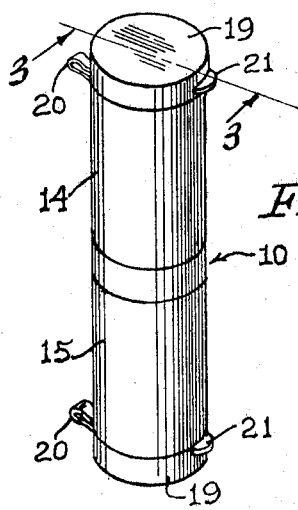
FIG. 1 is a perspective view of the invention.
Figure 2:
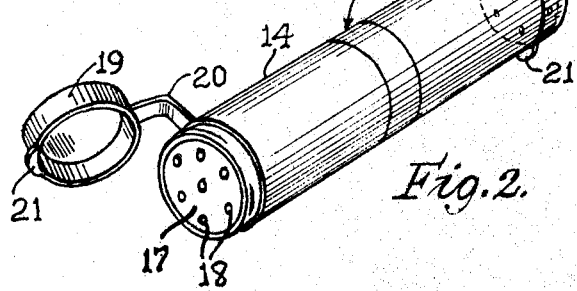
FIG. 2 is a perspective view of the invention similar to FIG. 1 but showing one of the caps embodied in the invention in open position.
Figure 3:
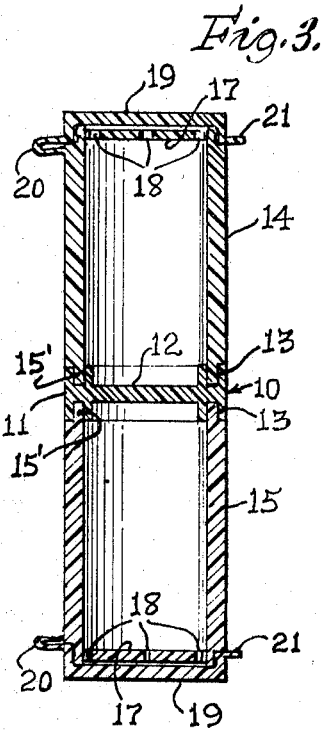
FIG. 3 is a sectional detailed view of the invention taken substantially on line 3—3 of FIG. 1.
Figure 5:
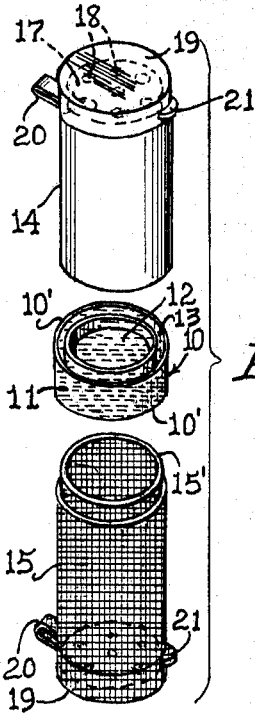
FIG. 5 is a perspective view of the invention with parts thereof shown in exploded relation.
Figure 4:
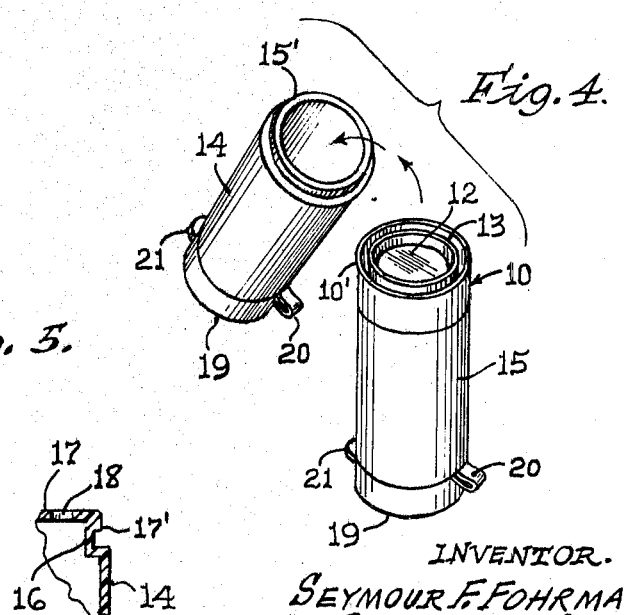
FIG. 4 is a perspective view of the invention showing one of the containers thereof removed from connection with its companion container.
Figure 6:
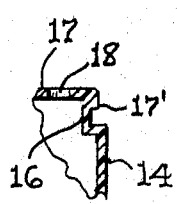
FIG. 6 is a fragmentary sectional detailed view of the outer end of one of the containers.

The several objects of this invention are accomplished by the preferred form of construction shown in the accompanying drawings wherein my invention is shown as comprising an intermediate coupling 10 having cylindrical walls 11 and a centrally located web or wall 12. The opposite edge portions 10′ of the coupling 10 have formed therein inwardly extending circular channels 13.

Containers 14 and 15 are of elongated tubular formation and are provided with reduced adjacent inner end portions 15′. Such reduced ends frictionally fit into the channels 13 to removably connect in alignment and end abutment with respect to each other the containers 14 and 15.

The outer end portions of the containers 14 and 15 are each provided with a reduced neck 16 which provides around its outer cylindrical edge a bead 17′.

The outer end of each container 14 and 15 has press fitted in its open end a disc 17 provided with a plurality of perforations 18 through which the contents of the container may be discharged by shaking the container.

The perforations are closed by a cap 19 which fits over the flange 16. By reason of the flexibility of the material from which the cap is formed the sides of the cap will snap over the bead 17′ into a latched position upon the container.

The cap 19 by means of a hinge in the form of an elongated strap 20 is integrally connected to its respective container. The cap, hinge and container are preferably formed of the same material to adapt the cap, hinge and container for simultaneously molding and formation into an integral unit. The material may be polyethylene plastic or vinyl plastic or any other material which will adapt the simultaneous molding and formation of the cap, hinge and container as a single structure. The material should be such as is highly resistant to fatigue failure caused by the frequent opening and closing of the cap.

To facilitate the opening and closing of the cap 19 I provide on the cap opposite the hinge 20 a lug 21 beneath which the finger or thumbnail may be positioned to apply pressure thereon to open the cap.

The containers 14 and 15 each may be of a different color, for example, one may be white to indicate that its contents are salt, and the other black to indicate that its contents are pepper.

From the foregoing description it is apparent that my combined salt and pepper shaker is simple, compact, moisture-proof, economical in manufacture, and ideal for the purposes for which it is intended. It is easily cleaned and easily filled. Can be handled easily in the discharge of the material therein by merely reversing the movement of the wrist of the hand, the web or wall 12 serving as a bottom common to both containers.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

1. A combination salt and pepper shaker having an elongated body consisting of a pair of identically shaped hollow tubular members removably connected in end-to-end relation with each member having one end thereof closed by a perforated wall and its opposite end open and adapted to receive an intermediate connecting member wherein the improvement comprises:
 (a) an intermediate connecting member comprising a circular coupling having a diameter equal to the diameter of the tubular members and disposed therebetween for independently connecting each of them thereto and in an end-to-end relation,
 (b) said coupling providing a circular wall terminating at its periphery into oppositely disposed annular channels with said channels frictionally receiving confronting edge portions of the open ends of each of the tubular members for independently and removably connecting the tubular members thereto with said wall common to their open ends and adapted to close the same when the tubular members are connected to said coupling, (c) flexible caps for removably closing each of the perforated ends of the tubular members, and (d) integral flexible hinges between said caps and the outer cylindrical walls of each of the tubular members adjacent their perforated ends for connecting said caps thereto.

References Cited

UNITED STATES PATENTS

| 178,818 | 6/1876 | Warner | 215—6 X |
| 142,670 | 9/1873 | Bird | 222—142.3 |
| 2,459,133 | 1/1949 | Nyberg | 222—142.2 |
| 2,891,704 | 6/1959 | Morrison | 222—562 X |
| 2,940,645 | 6/1960 | Albioni | 222—565 X |
| 3,144,152 | 8/1964 | Kopp | 215—6 |

SAMUEL F. COLEMAN, Primary Examiner

N. L. STACK, Assistant Examiner